US00RE43492E

(19) United States
(12) Reissued Patent
Willis et al.

(10) Patent Number: US RE43,492 E
(45) Date of Reissued Patent: Jun. 26, 2012

(54) UNDERWATER LED LIGHT

(75) Inventors: Vance E. Willis, Nunnelly, TN (US); Ronald H. Griffin, Boonville, NC (US); Vitaly Shinkarev, Greensboro, NC (US)

(73) Assignee: Hayward Industries, Inc., Elizabeth, NJ (US)

(21) Appl. No.: 12/258,091

(22) Filed: Oct. 24, 2008

Related U.S. Patent Documents

Reissue of:
(64) Patent No.: 7,125,146
Issued: Oct. 24, 2006
Appl. No.: 10/880,755
Filed: Jun. 30, 2004

(51) Int. Cl.
*F21V 29/00* (2006.01)

(52) U.S. Cl. ..... 362/267; 362/158; 362/249.02; 340/852

(58) Field of Classification Search ..... 362/101, 362/158, 267; 340/850–852; 361/212, 215, 361/232, 799
See application file for complete search history.

(56) References Cited

U.S. PATENT DOCUMENTS

| | | | | |
|---|---|---|---|---|
| 2,072,841 | A | 3/1937 | Tracey et al. | |
| 2,683,620 | A | 7/1954 | Keech | |
| 3,456,103 | A | 7/1969 | Bond | |
| 3,949,213 | A | 4/1976 | Paitchell | |
| 3,962,675 | A | 6/1976 | Rowley et al. | |
| 4,053,758 | A | 10/1977 | Shaw | |
| 4,211,955 | A * | 7/1980 | Ray | 315/53 |
| 4,234,819 | A | 11/1980 | Maxey | |
| 4,539,629 | A | 9/1985 | Poppenheimer | |
| 4,574,337 | A | 3/1986 | Poppenheimer | |
| 4,617,615 | A | 10/1986 | Eychaner | |
| 4,617,617 | A | 10/1986 | Cunningham et al. | |
| 5,122,936 | A | 6/1992 | Guthrie | |
| 5,349,505 | A | 9/1994 | Poppenheimer | |

(Continued)

FOREIGN PATENT DOCUMENTS

GB 2021749 12/1979

OTHER PUBLICATIONS

UL Safety Standard 676, entitled "Underwater Luminaires and Submersible Junction Boxes," printed from Internet website http://ulstandardsinfonet.ul.com/scopes/0676.html (Jan. 24, 2006) (1 page).

(Continued)

*Primary Examiner* — Jason Moon Han
(74) *Attorney, Agent, or Firm* — McCarter & English, LLP

(57) ABSTRACT

An underwater light, e.g., for a pool or spa, includes an ordinarily watertight housing, an outer compartment within the housing and floodable by water flowing therein in the event the housing is no longer watertight, a current shield within the outer compartment and at least partially defining an inner compartment within the outer compartment, a light emitter within the inner compartment, a passageway communicating between the inner and outer compartments such that outer compartment flood water can enter the inner compartment and contact the light emitter, and a conductor. The conductor is positioned so as to collect stray electrical current conducted from the inner compartment by water within the passageway, thereby reducing the risk of shock presented by such stray electrical current. The underwater light is installable within a wet niche, and includes a transformer housed in a separate compartment that extends into the wet niche for thorough cooling thereof.

45 Claims, 5 Drawing Sheets

U.S. PATENT DOCUMENTS

| | | | |
|---|---|---|---|
| 5,432,688 | A | 7/1995 | Tobias et al. |
| 5,483,428 | A | 1/1996 | Poppenheimer |
| 5,545,952 | A | 8/1996 | Mortensen |
| 5,556,188 | A | 9/1996 | Poppenheimer |
| 5,607,224 | A | 3/1997 | Tobias |
| 5,842,771 | A | 12/1998 | Thrasher et al. |
| 5,908,236 | A | 6/1999 | Lueken et al. |
| 6,016,038 | A | 1/2000 | Mueller et al. |
| 6,149,283 | A | 11/2000 | Conway et al. |
| 6,184,628 | B1 | 2/2001 | Ruthenberg |
| 6,196,471 | B1 | 3/2001 | Ruthenberg |
| 6,315,424 | B1 | 11/2001 | Hui |
| 6,340,868 | B1 | 1/2002 | Lys et al. |
| 6,379,025 | B1 | 4/2002 | Mateescu et al. |
| 6,435,691 | B1 | 8/2002 | Macey et al. |
| 6,528,954 | B1 | 3/2003 | Lys et al. |
| 6,577,073 | B2 | 6/2003 | Shimizu et al. |
| 6,616,291 | B1 | 9/2003 | Love |
| 6,798,154 | B1 | 9/2004 | Suilivan et al. |
| 6,811,286 | B2 | 11/2004 | Mateescu et al. |
| 2002/0101198 | A1 | 8/2002 | Kemp |
| 2003/0048632 | A1 | 3/2003 | Archer |
| 2003/0137838 | A1 | 7/2003 | Rizkin et al. |
| 2004/0208008 | A1 | 10/2004 | Mateescu et al. |

OTHER PUBLICATIONS

UL Safety Standard 676, entitled "Underwater Luminaires and Submersible Junction Boxes," printed from Internet website http://ulstandardsinfonet.ul.com/0676.html (Jan. 24, 2006).

* cited by examiner

UNDERWATER LED LIGHT

Matter enclosed in heavy brackets [ ] appears in the original patent but forms no part of this reissue specification; matter printed in italics indicates the additions made by reissue.

FIELD OF THE INVENTION

The present invention relates to submergible lights and light fixtures and, more particularly, to underwater LED lights for use in swimming pools and spas.

BACKGROUND OF THE INVENTION

Modern designs for swimming pools and spas commonly provide for illumination of the pool or spa from beneath the waterline. For example, underwater light assemblies equipped with glass or plastic external lenses can be installed on and/or in the wall of a pool or spa below the waterline such that part or all of the external lens faces into the pool or spa, and is exposed to the water contained therein. Typically the external lens of such a light at least partially defines a water-tight illumination compartment of the light within which the light-emitting element or light emitter is mounted. While such an arrangement can be advantageous from the standpoint of illumination efficiency, it has long been recognized that such light assemblies can pose a risk of electric shock to bathers, especially if deliberate steps to mitigate this risk are not taken (e.g., during the product design phase). For example, should the water-tight integrity of the compartment containing the light emitter become compromised (e.g., while the pool and the light assembly are in use, and/or during pool or light assembly maintenance, etc.) and pool or spa water is admitted therein, a direct path of conductive water could be created along which current, previously contained within the light assembly, could stray into the main body of the pool or spa.

At least one commonly followed standard for safety with respect to such underwater lights, namely, Standard for Safety for Underwater Luminaires and Submersible Junction Boxes, UL 676, eighth edition, dated Jun. 9, 2003 and developed and maintained by Underwriter's Laboratories Incorporated of Northbrook Ill., recognizes that there are many different ways in which the risk to bathers of electrical shock from such underwater lights can be reduced and/or eliminated. In accordance with the UL 676 standard, many manufacturers have, for example, developed underwater lights with external lenses made of certain modern plastic and/or other polymeric materials, such as polycarbonate (e.g., from the LEXAN series of polycarbonate/plastics resins manufactured by General Electric Co.), or polycarbonate alloy, and in this way have obtained the desired safety certification. By choosing this design path, such manufacturers are essentially relying on the basic toughness and resiliency of such materials to avoid lens degradation via such stressors as impact shock, thermal shock, fatigue-inducing thermal cycling, etc. Unfortunately, such materials also have drawbacks in comparison to more traditional lens materials, such as optical glass and/or similar (i.e., glass-like) materials. For example, such plastic or polymeric materials tend to become internally cloudy over time, and are typically not very scratch-resistant. This limits their utility, at least with respect to certain underwater light markets, such as the market for commercial and high-end consumer pool and spas, in which premiums are often placed on such characteristics as overall aesthetic appearance, and/or sustained brightness/luminosity, etc.

Seeking to service such markets, some other manufacturers produce high-quality underwater lights equipped with external lenses made from the more traditional glass or glass-like materials. Unfortunately, such lenses tend not to exhibit the type of strength and toughness which characterizes the above-mentioned plastic and polymer-type lenses. Accordingly the external lenses of such underwater lights are characteristically more likely to fail the impact and/or thermal shock tests associated, for example, with the above-mentioned UL 676 safety standard. In such circumstances, in order to achieve the desired safety certification with respect to the risk of shock from stray electrical current, design solutions must generally be devised and implemented which ensure that, even in the event of a complete fracture of the external lens, resulting in a complete flooding of the light fixture and/or a short in the applicable electrical and/or electronic circuit, the shock risk to nearby bathers is nevertheless still acceptable. Some such design solutions are disclosed in U.S. Patent Application Publication No. 2002/0101198, and in U.S. Pat. Nos. 3,949,213; 4,234,819; 5,545,952; and 5,842,771. Accordingly, design solutions for underwater lights shown to reduce the shock risk to nearby bathers to acceptable levels are both necessary and desirable.

In addition to contending with issues relating to the risk of electrical shock to nearby bathers, manufacturers of high quality underwater lights must ensure that, to the extent excessive heat is generated by the various components thereof, e.g., light-emitting elements, transformers, microprocessors (if applicable), etc., such heat is promptly and efficiently conducted away from the light. In particular, certain types of underwater lights, e.g., underwater lights equipped with one or more LED arrays, tend to produce heat in such quantity that the effectiveness of the methods and apparatus employed therein for heat removal is critical to issues such as safe operation and product reliability/durability. Especially in light of the current trend toward brighter and brighter underwater lights, including underwater lights producing white light via the simultaneous illumination of separate arrays of blue, red and green LEDs, the development and deployment of effective new methods and apparatus for conducting heat from underwater lights is an industry priority.

SUMMARY OF THE INVENTION

The present invention overcomes the disadvantages and shortcomings of the prior art discussed above by providing a new and improved underwater light for use in spas, pools, and the like which substantially reduces and/or eliminates the risk of shock to nearby bathers from stray electrical current escaping from the light. More particularly, the underwater light includes a housing, an outer compartment within the housing, a current shield within the outer compartment and at least partially defining an inner compartment within the outer compartment, and a light emitter within the inner compartment. Ordinarily, the housing is water tight, but in the event the housing is no longer watertight (e.g., due to accidental damage to the housing, such as a lens fracture), the outer compartment is subject to flooding by water flowing therein. The underwater light further includes a passageway communicating between the inner and outer compartments such that flood water in the outer compartment can enter the inner compartment and come into contact with the light emitter. The underwater light further includes a conductor positioned so as to collect stray electrical current conducted from the inner compartment by water within the passageway and thereby reduce a risk of shock presented by such stray electrical current.

In accordance with one aspect of the current invention, the conductor is grounded and includes an electrically conductive surface which at least partially defines the passageway. In accordance with another aspect of the invention, an electrically insulative surface of the current shield is disposed opposite the electrically conductive surface. In accordance with a further aspect of the invention, the underwater light further includes a transformer compartment spaced apart from the inner and outer compartments by a distance sufficiently long so as to permit a free flow of water in a space between the transformer compartment and the inner and outer compartments for efficient removal of heat therefrom.

BRIEF DESCRIPTION OF THE DRAWINGS

For a more complete understanding of the present invention, reference is made to the following detailed description of exemplary embodiments of the present invention, considered in conjunction with the accompanying drawings, in which.

DETAILED DESCRIPTION OF THE INVENTION

Although the present invention can be used in conjunction with any type of underwater lighting application, it is particularly suitable for use in connection with pools, spas, baths and the like. Accordingly, the present invention will be described hereinafter in connection with swimming pool and spa lighting applications. It should be understood, however, that the following description is only meant to be illustrative of the present invention and is not meant to limit the scope of the present invention, which has applicability to other types of underwater applications, such as aquariums, fish ponds, water park rides, venues for viewing aquatic animal performances, etc.

Figure 1:
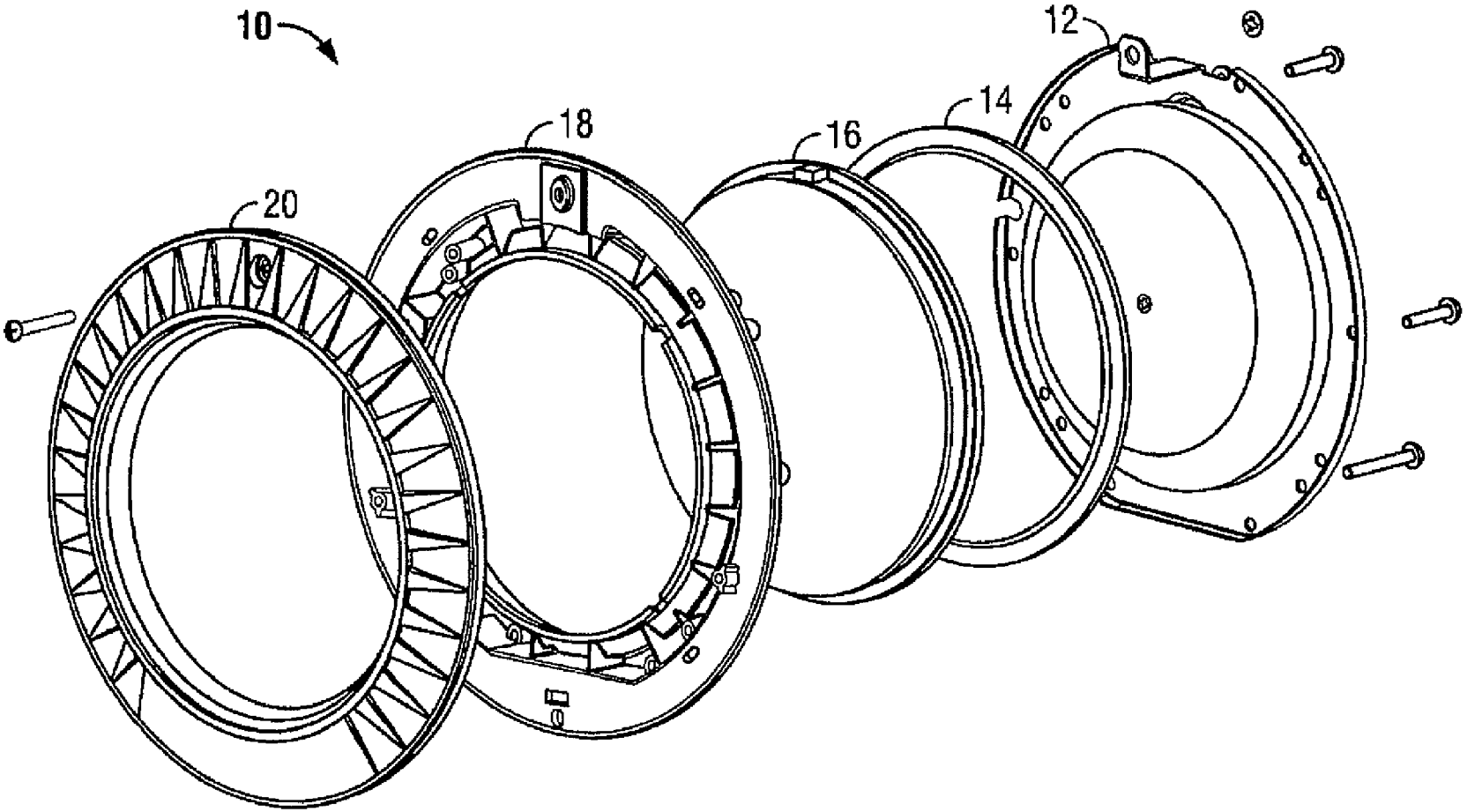
FIG. 1 is a perspective exploded view of an underwater light assembly constructed in accordance with a first embodiment of the present invention.

Referring to FIG. 1, there is shown in perspective exploded view an underwater light assembly 10 for use in a swimming pool. The underwater light assembly includes a backplate/PCA assembly 12, a lens gasket 14, a lens 16, a body 18, and a face plate 20.

Figure 2:
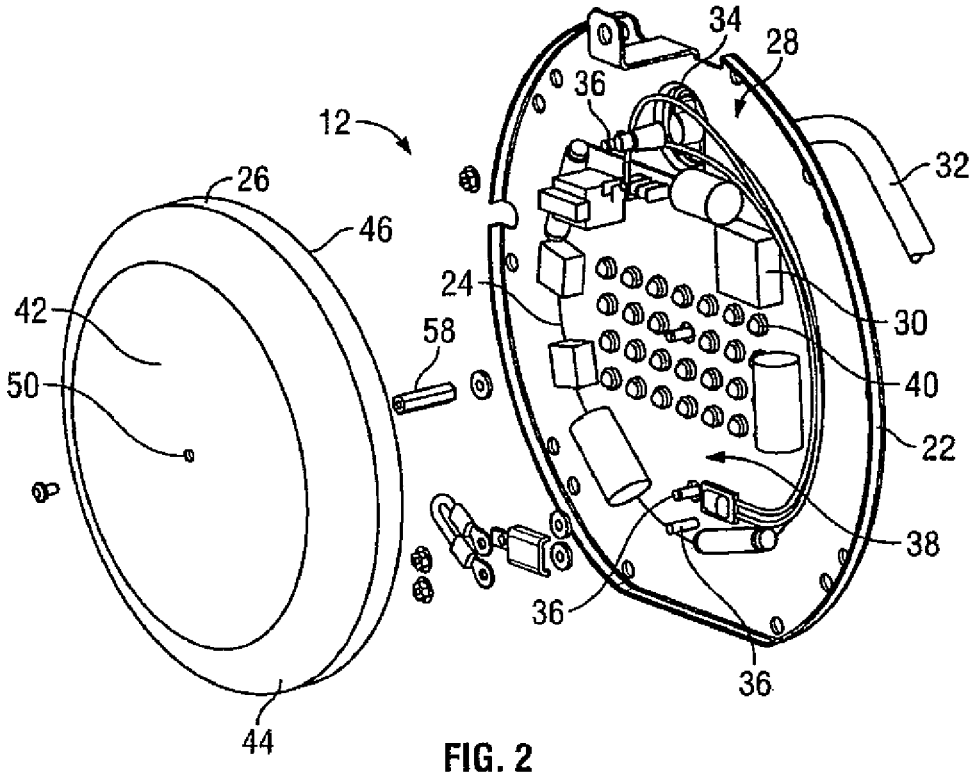
FIG. 2 is a perspective exploded view of a backplate/PCA assembly of the underwater light assembly shown in FIG. 1.

The backplate/PCA assembly 12 of FIG. 1 is shown in another exploded assembly perspective view in FIG. 2. As shown in FIG. 2, the backplate/PCA assembly 12 includes a backplate 22, a printed circuit assembly 24, and a current shield 26. The backplate 22 includes an interior surface 28 which is both electrically conductive and grounded. The printed circuit assembly 24 is secured directly to the interior surface 28 via thermally conductive adhesive so as to facilitate conductive cooling of the printed circuit assembly 24 during high-voltage operation. The printed circuit assembly 24 includes a transformer 30 for receiving external 120V A/C power and stepping the same down to 36V A/C power, as well as rectifier circuitry (not shown) to convert the 36V A/C output of the transformer to 36V D/C for use as internal power. The external A/C power is supplied to the underwater light assembly 10 via electrical leads (not shown) contained in an electrical conduit 32 secured to the rear of the backplate 22 and connected to the printed circuit assembly 24 in a conventional fashion via an access hole 34 (otherwise plugged with potting material, and therefore water-tight) in the backplate 22. Grounding of the backplate 22 and the printed circuit assembly 24 is accomplished in a similar fashion, via respective grounding posts 36 attached thereto for the purpose.

The printed circuit assembly 24 is employed as a light emitter, and includes a front side 38 populated by a plurality of light-emitting diodes (LEDs) 40 arranged in three separately controllable arrays for emitting red, green, and blue light, respectively. As such, any one such LED array may be illuminated alone, or more than one such LED array may be illuminated simultaneously. Various colors and intensities of light may thereby be produced, at the discretion of the user, including white light of considerable brightness.

The current shield 26 is formed from transparent plastic so as to permit substantially all light produced by the LEDs 40 on the printed circuit assembly 24 to reach the lens 16, and thereby be emitted into the pool water. Of simple construction, the current shield 26 is relatively thin (i.e., 0.06 inches) and is dome-shaped, having a top span 42, and side walls 44 which extend downward from the top span 42, terminating in an edge 46, circular in shape, and forming a downward-facing electrically insulative surface (not separately shown) disposed opposite the interior surface 28 of the backplate 22. The current shield 26 also includes an interior surface 48 (see FIG. 3) which is substantially imperforate (i.e., with the exception of an axially-positioned through hole 50 (FIG. 2) in the top span 42 for the accommodation of mounting hardware). These characteristics of the current shield 26 prevent such water as may impinge against the interior surface 48 from passing therethrough, and/or through the entire thickness of the current shield 26 (see, hereinafter, the related discussion regarding pool water flooding the underwater light assembly 10). The plastic material of the current shield 26, being also electrically insulative, also prevents electrical current disposed on or near the interior surface 48 of the current shield 26 from penetrating the current shield 26.

Figure 3:
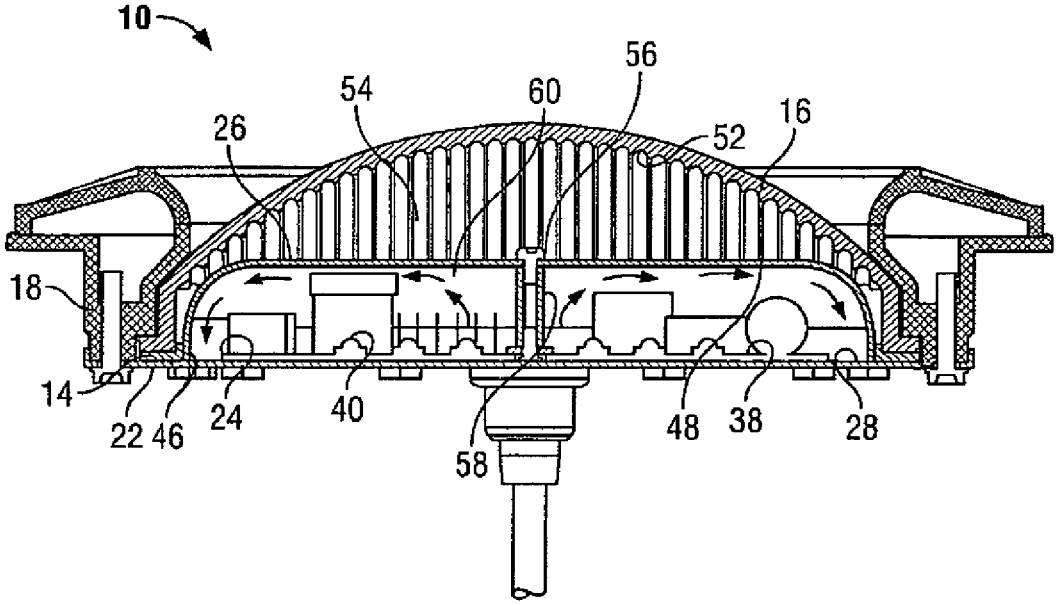
FIG. 3 is a side cross-sectional view of the underwater light assembly shown in FIG. 1.

Referring to FIG. 3, a side cross-sectional view of the underwater light assembly 10 is shown. As shown in FIG. 3, the lens 16, which is made of optical glass, includes an interior surface 52. The interior surface 52 of the lens 16, in combination with the lens gasket 14, the interior surface 28 and sealed access hole 34 of the backplate 22, and the front side 38 of the printed circuit assembly 24, defines an outer compartment 54 within the underwater light assembly 10. At least the LEDs 40 (and associated electronics) and the current shield 26 are contained within the outer compartment 54. The body 18 of the underwater light assembly 10 is secured to the backplate 22 via appropriate mounting hardware, and the face plate 20 is secured to the body. The lens 16 and the lens gasket 14 are thereby clamped between the backplate 22 and the body 18. As a result of this arrangement, the lens gasket 14 is compressed, and the ordinarily dry outer compartment 54 is rendered substantially water-tight.

As also shown in FIG. 3, the current shield 26 is secured to the backplate 22 via a screw 56 passing through the through-hole 50 (FIG. 2), along with other conventional mounting hardware, including a standoff 58. The standoff 58 extends upward from the front surface 38 of the printed circuit assembly 24, and is of sufficient height to ensure that the above-described method of securing the current shield 26 to the backplate 22 results in the edge 46 of the current shield 26 abutting the conductive interior surface 28 of the backplate 22. As a result, a simple, non-watertight interface is formed therebetween, having a width equivalent to the thickness of the edge 46 of the current shield 26. An inner compartment 60 within the outer compartment 54 is defined at least in part by the interior surface 48 of the current shield 26, the interior surface 28 and sealed access hole 34 of the backplate 22, and the front side 38 of the printed circuit assembly 24. To the extent water is permitted to flow through the non-watertight interface between the edge 46 of the current shield 26 and the conductive interior surface 28 of the backplate 22, that interface may be considered a passageway communicating between the inner compartment 60 and the outer compartment 54.

With respect to normal underwater lighting operation, for purposes of the present discussion, the underwater light assembly 10 functions in a manner similar to conventional underwater lights equipped with printed circuit assemblies populated with LEDs as the principle light emitters or lighting elements. However, the underwater light assembly 10 further performs a stray electrical current collection function, as described below.

In the event the watertight integrity of the outer compartment 54 is compromised (e.g., via a crack in the lens 16 caused by impact trauma), pool water may be expected to flood the outer compartment 54 of the underwater light assembly 10. A portion of such flood water may be expected to further invade the inner compartment 60 by flowing through the non-watertight interface (or passageway) between the edge 46 of the current shield 26 and the interior surface 28 of the backplate 22. Such invading flood water could then contact the printed circuit assembly 24, causing an electrical short in the high-voltage and/or power supply electronics thereof. As a result of such a short, electrical current previously contained within the printed circuit assembly 24 may be expected to escape therefrom, after which such stray electrical current will be borne by a volume of flood water adjacent to and impinging against the printed circuit assembly 24. Presuming, temporarily, that the above-mentioned current shield 26 is absent from of the underwater light assembly 10, the compromised watertight integrity of the outer compartment 54 would give rise to a significant risk that a considerable amount of such stray electrical current would be conducted through the flood water, out of the outer compartment 54, and into the main body of pool water, placing nearby bathers at risk of electrical shock.

Given, however, that the current shield 26 both exists and is assembled to the backplate 22 as described above, any such stray electrical current (indicated by corresponding arrows within the inner compartment 60) has no other route to escape from the inner compartment 60 and into the compromised outer compartment 54 except along one or more continuous paths of conductive flood water leading through the non-watertight interface or passageway between the edge 46 of the current shield 26 and the interior surface 28 of the backplate 22. Prototype tests of the underwater light of the present invention, conducted in accordance with the provisions of UL 676 (see the Background section above), have demonstrated that most, if not substantially all such stray electrical current does not, in fact, emerge from the inner compartment 60 and enter the compromised outer compartment 54. While not desiring to be bound by theory, applicants believe that a combination of an adequate thickness of the edge 46 of the current shield 26, the close proximity of the edge 46 to the interior surface 28 of the backplate 22, the conductive characteristics of the interior surface 28, and the path to ground originating therefrom, causes substantially all such stray electrical current (e.g., such stray electrical current as enters the relevant interface) to pass entirely out of the flood water, enter the backplate 22 via the adjacent interior surface 28, and flow directly to ground. As a result, little to no such stray electrical current actually escapes the underwater light assembly 10, and nearby bathers are well-protected from electrical shock. As the terms "substantially all stray electrical current" and "any and substantially all stray electrical current" are used herein, at least one meaning each term shall be considered to have is the following: enough such stray electrical current to ensure that the maximum acceptable levels of stray electrical current escaping the underwater light, according to a conventional standard such as UL 676, are adhered to.

It should be appreciated that the underwater light assembly 10 of the present invention provides numerous advantages over the prior art discussed above. For example, with the risk of electric shock from stray electrical current lowered to an acceptable level by guiding the stray electrical current from the flood water to ground by operation of the current shield 26, the selection of materials for the lens 16 is not restricted by a desire to maximize toughness or resiliency to prevent fracture thereof. As a result, the lens 16 may comprise any otherwise suitable material, including but not limited to glass and glass-type materials, which tend to retain a scratch-free non-cloudy appearance. Also, the higher thermal conductivity of glass contributes to the important function of cooling the underwater light assembly through the external interface between the lens 16 and the pool water, an especially important consideration in the current context because of the tendency of LEDs to run very hot. Further, the grounding arrangement is relatively simple (e.g., very few parts), reliable (e.g., no moving parts or "solid state"), and inexpensive (e.g., the current shield 26 can be manufactured in large quantities from inexpensive plastic materials via conventional molding techniques, and the current shield 26 itself takes up very little otherwise useable space within the outer compartment 54).

It should be noted that the underwater light assembly 10 of the present invention can have numerous modifications and variations. For instance, the LEDs 40 may be replaced with other types of light-emitting elements, and the printed circuit assembly 24 may be eliminated and/or replaced by other equipment designed to support, control, and/or provide power to the light-emitting elements. By way of example, the underwater light assembly 10 may include one or more incandescent or halogen bulbs, and/or neon lights, etc., with appropriate sockets. The 120V A/C external power routed to the underwater light assembly 10 may be replaced by 12V A/C external power (in which case the transformer 30 can be configured to step the external power up to 36V A/C), 12V D/C external power, and/or A/C or D/C power defined by an alternative standard, or by no particular standard. The backplate 22, ordinarily metallic (e.g., ASTM A 240 Type 304 18GA Stainless Steel), may comprise one or more non-metallic materials (e.g., ceramic, glass, plastic) provided the replacement material or collection of materials provide adequate conductive cooling for the printed circuit assembly 24, and an adequate amount of conductive, grounded material is provided at/along the interior surface 28 of the backplate 22 at its current-collecting interface with the current shield 26.

The dome-shaped current shield 26 can be replaced by a current shield of any suitable shape, including planar, oblong, rectangular, and/or polygonal, etc., or thickness, including thicknesses greater than or less than its 0.06" thickness. The plastic material (e.g., transparent polycarbonate, such as GE Plastics LEXAN 953A) of the current shield 26 may be replaced by other electrically insulative materials providing good light transmissibility, such as one or more types of glass. A current shield which is translucent, but not specifically transparent, may be used if desired. Small gaps in the edge 46 of the current shield 26 (and/or in the conductivity of the interior surface 28 of the backplate 22 opposite the edge 46) or small perforations in the current shield 26 are allowable to the extent they do not result in the amount of escaping stray electrical current exceeding the maximum allowable under the applicable safety standard (e.g., UL 676). Multiple materials may be employed for the current shield 26, e.g., in combination, such as in layers, and/or thin coatings. In addition, the interior surface 28 of the current shield 26 need not be completely electrically insulative (e.g., it may be at least partially electrically conductive, e.g., via a thin electrodeposited metal layer), provided current is still prevented from flowing through the current shield 26 across its thickness.

The edge 46 and the interior surface 28 meet along a circular peripheral interface. However it is not necessary that such an interface be circular. As such, the interface may describe one or more other shapes, in addition or alternatively, including oblong, curved but having at least one straight side, polygonal, etc.

The edge 46 and the interior surface 28 are in physical contact along corresponding peripheral surfaces (not separately shown) which are complementary at least in that both are substantially planar. As such, the flatness of the resulting interface can be controlled if necessary by easily-achieved flatness tolerances along with adequate material stiffness, and the width of the resulting interface can be controlled by specifying an appropriate thickness for the current shield 26 and/or an appropriate radial width of an annular conductive surface of the interior surface 28 of the backplate 22. However, the corresponding peripheral surfaces need not be necessarily flat and/or planar in shape. For example, the peripheral surfaces (not separately shown) may describe one or more shapes (e.g., in addition to planar/flat, or alternatively thereto) such as curved, frustoconical, cylindrical, and/or labyrinthine, etc., while remaining effective from a stray electrical current collection standpoint.

The current shield 26 can be assembled to the backplate 22 in such a way as to create a partial (e.g., incomplete, intermittent, and/or irregular, etc.) or even continuous (e.g., complete) gap between the edge 46 and the interior surface 28. Such a gap or series of gaps can grow or shrink accordingly (e.g., according to an iterative design process), in keeping with a goal of reducing the amount of water-borne stray electrical current which is allowed to escape from the inner compartment 60 to an acceptably low level. While the present applicants observe that a gap of more than 0.1 inches or more can be acceptable in certain instances, a gap 0.1 inches or less, and in particular a gap of 0.02 inches or less, has been observed to provide excellent stray electrical current collection results in conjunction with an interface which is otherwise permeable to flood water. Similarly, while the present applicants observe that a current shield 26 having a edge width or edge thickness of less than 0.04 inches can be acceptable in some instances, an edge thickness of 0.04 inches or greater, and in particular an edge thickness in a range of about 0.05 inches to about 0.07 inches, has been observed to provide excellent stray electrical current collection results. While edge thicknesses larger than 0.07 inches are acceptable in many instances, applicants have observed current shields 26 having relatively shorter edge thicknesses can be superior from a light transmission standpoint (e.g., presuming such current shields 26 to be of substantially uniform thickness). A current shield 26 having a non-uniform thickness (i.e., thicker at the edge 46 than elsewhere) can also be used.

Figure 4:
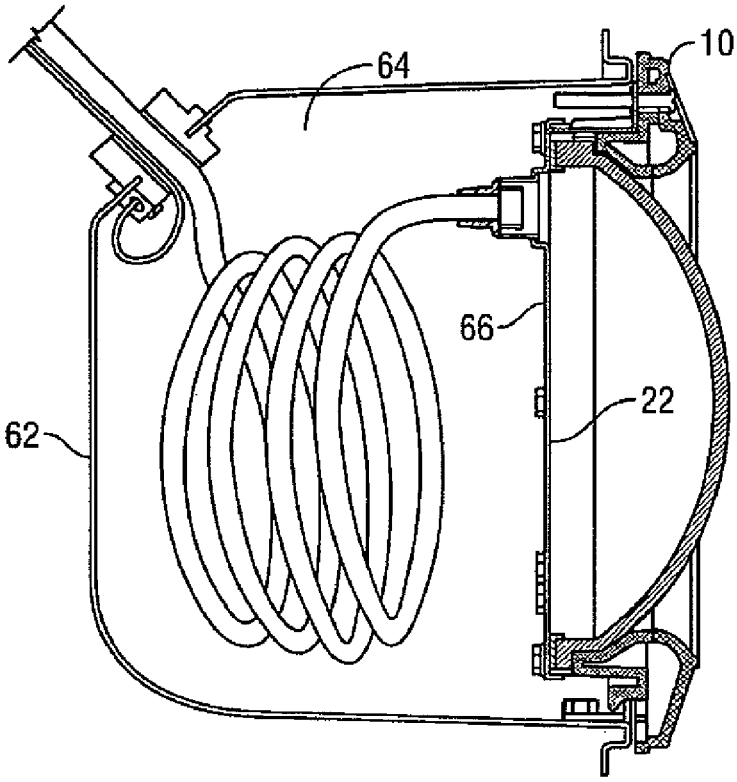
FIG. 4 is a side cross-sectional view of the underwater light assembly of FIG. 1, shown assembled within a wet niche.

Referring to FIG. 4, the underwater light assembly 10 (shown, for purposes of a simplified illustration, without certain internal components such as the printed circuit assembly 24, the current shield 26, etc.) can be installed within an appropriate wet niche 62, e.g., Hayward Pool Product's SP0604C wet niche, such that pool water flowing in and out of an inner chamber 64 of the wet niche 62 may be used to cool a rear surface 66 of the backplate 22. Such wet niches are often built into concrete pool walls, and their use can be especially beneficial when, as in the present invention, the underwater light employed is equipped with multiple high-intensity LEDs requiring relatively rapid rates of heat removal to ensure their operating temperatures remain within an acceptable range.

A second exemplary embodiment of the present invention is illustrated in FIGS. 5–8. Elements illustrated in FIGS. 5–8, which correspond substantially to the elements described above with respect to FIGS. 1–4, have been designated by corresponding reference numerals increased by one hundred. The embodiment of the present invention shown in FIGS. 5–8 operates and is constructed in a manner consistent with the foregoing description of the underwater light assembly shown in FIGS. 1–4, unless it is stated otherwise.

Figure 5:
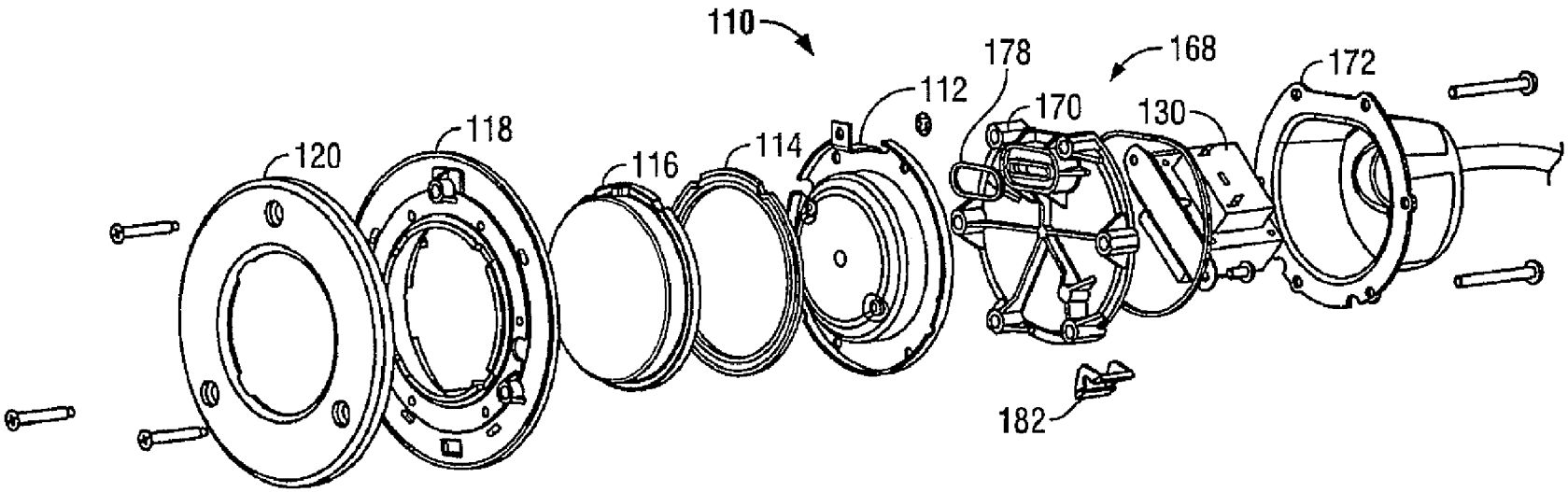
FIG. 5 is a perspective exploded view of an underwater light assembly constructed in accordance with a second embodiment of the present invention.
Figure 7:
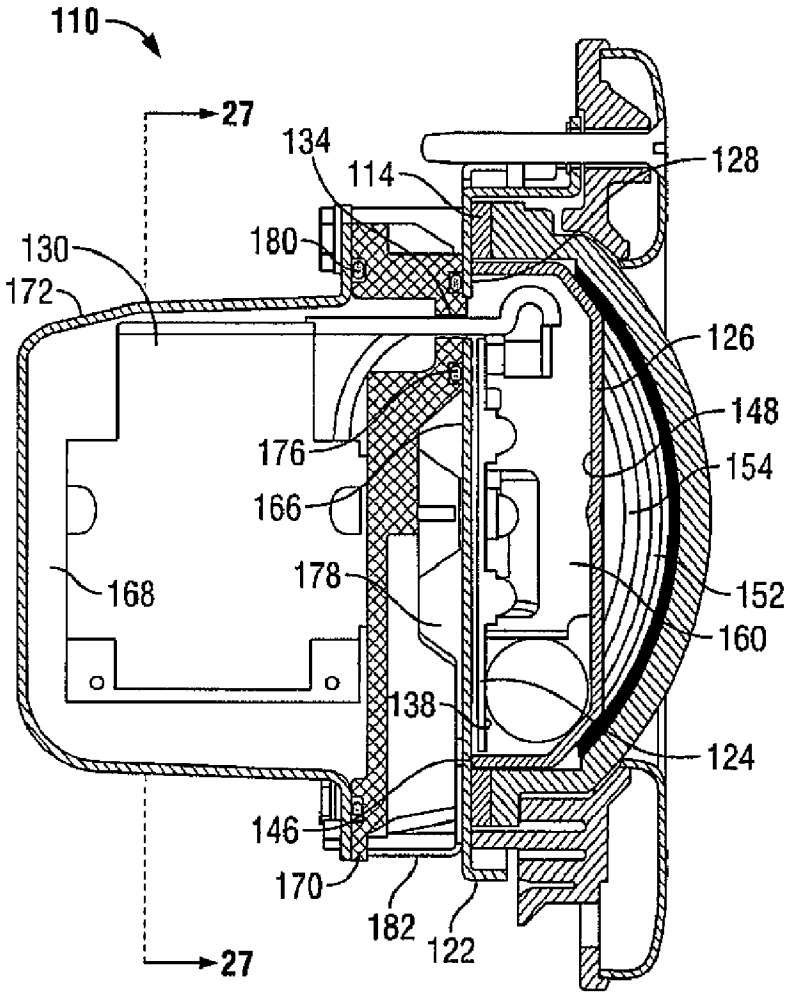
FIG. 7 is a side cross-sectional view of the underwater light assembly shown in FIG. 5.
Figure 6:
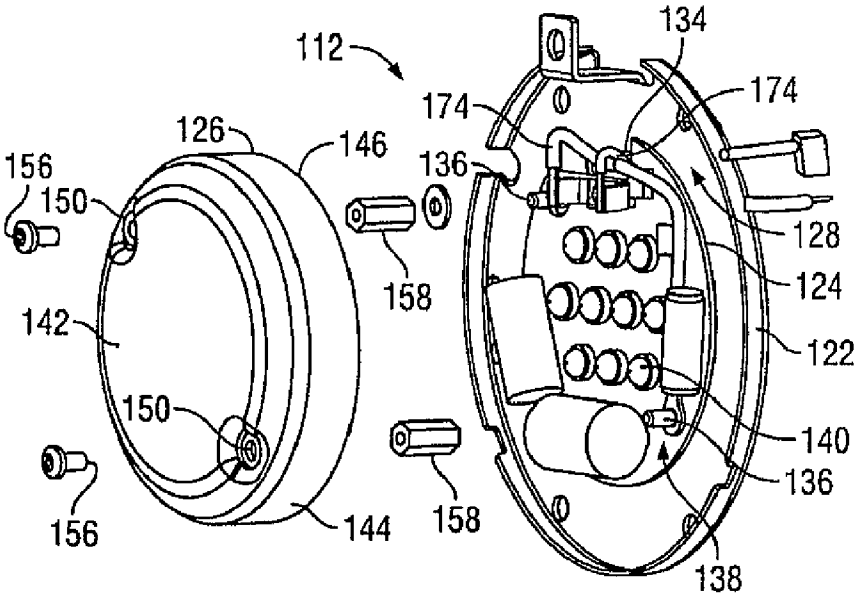
FIG. 6 is a perspective exploded view of a backplate/PCA assembly of the underwater light assembly shown in FIG. 5.

In FIGS. 5–7, there is shown an underwater light assembly 110 constructed in accordance with a second embodiment of the present invention, and suitable for use in a spa. Referring to FIG. 5, in addition to a backplate/PCA assembly 112, a lens gasket 114, a lens 116, a body 118, and a face plate 120, the underwater light assembly 110 includes a separate transformer compartment 168 which includes a base 170 and a rear cover 172 for separately housing a transformer 130, which steps exterior 120V A/C power down to 12V A/C.

Referring to FIG. 6, the backplate/PCA assembly 112 of FIG. 5 is shown in another exploded assembly perspective view. As shown in FIG. 6, the backplate/PCA assembly 112 includes a backplate 122, a printed circuit assembly 124, and a current shield 126. The backplate 122 includes an interior surface 128 which is both electrically conductive and grounded. The printed circuit assembly 124 is secured directly to the interior surface 128 via thermally conductive adhesive so as to facilitate conductive cooling of the printed circuit assembly 124 during lighting operation. The printed circuit assembly 124 does not include a transformer, unlike the printed circuit assembly 24 of the embodiment of FIGS. 1–4. Rather, the transformer 130 (FIG. 5) of the underwater light assembly 110 is separately mounted, as is mentioned above, and as will be explained in more detail hereinafter. 12V A/C power is supplied to the printed circuit assembly 124 via electrical leads 174 extending from the transformer compartment 168 (FIG. 5) connected to the printed circuit assembly 124 in a conventional fashion via an unsealed access hole 134 in the backplate 122, and is converted therein by rectifier circuitry (not shown) to 12V D/C for use as internal power. Grounding of the backplate 122 and the printed circuit assembly 124 is accomplished in a similar fashion, via respective grounding posts 136 attached thereto for such purpose.

The printed circuit assembly 124 includes a front side 138 populated by a plurality of light-emitting diodes (LEDs) 140 arranged in three separately controllable arrays for emitting red, green, and blue light, respectively. As such, any one such LED array may be illuminated alone, or more than one such LED array may be illuminated simultaneously. Various colors and intensities of light may thereby be produced, at the discretion of the user, including white light of considerable brightness. The printed circuit assembly 124 is considerably smaller than the printed circuit assembly 24 of the embodiment of FIGS. 1–4 so as to conform to the prevailing diametrical size standard for built-in spa light fixtures such as the underwater light assembly 110. As such, it is significant that the printed circuit assembly 124 is not populated by a 120V A/C to 12V A/C transformer, since the space that such a transformer would otherwise have occupied on the front side 138 of the printed circuit assembly 124 becomes available for population by additional LEDs 140. As shown in FIG. 6, such LEDs 140 have in fact been added to the printed circuit assembly with a result being that the maximum intensity of the light produced by the underwater light assembly 110 is increased significantly over what would otherwise be the case.

The current shield 126 is formed from transparent plastic so as to permit substantially all light produced by the LEDs 140 on the printed circuit assembly 124 to reach the lens 116, and thereby be emitted into the pool water. Of simple construction, the current shield 126 is relatively thin (i.e., 0.06 inches), and has a top span 142, and side walls 144 which extend downward from the top span 142, terminating in an edge 146, circular in shape, and downward-facing for close communication along the width of the edge 146 with the interior surface 128 of the backplate 122. The current shield 126 also includes an interior surface 148 (see FIG. 7) which is substantially imperforate (i.e., with the exception of two through holes 150 (FIG. 6) in the top span 142 for the accommodation of mounting hardware).

Referring to FIG. 7, a side cross-sectional view of the underwater light assembly 110 is shown. The interior surface 152 of the lens 116, in combination with the lens gasket 114, the interior surface 128 the backplate 122, and the front side 138 of the printed circuit assembly 124, defines an outer compartment 154 within the underwater light assembly 110. (The access hole 134, because it is not sealed, causes the transformer compartment 168 to communicate with the outer compartment 154 while remaining physically separate therefrom.)

As also shown in FIG. 7, the current shield 126 is secured to the backplate 122 via screws 156 (FIG. 6) passing through the through-holes 150 (FIG. 6), along with other conventional mounting hardware, including standoffs 158. An inner compartment 160 within the outer compartment 154 is defined at least in part by the interior surface 148 of the current shield 126, the interior surface 128 of the backplate 122, and the front side 138 of the printed circuit assembly 124. (The inner compartment 160 is also in communication with the transformer compartment 168.)

With respect to normal underwater lighting operation, for purposes of the present discussion, the underwater light assembly 110 functions in a manner similar to conventional underwater lights equipped with printed circuit assemblies populated with LEDs as the principle light emitters or lighting elements. However, the underwater light assembly 110 further performs a stray electrical current collection function, as described above with respect to the underwater light assembly 10 of the embodiment of FIGS. 1–4. To the extent stray electrical current enters flood water within the transformer compartment 168, and flows therefrom into the inner compartment 160 through the unsealed access hole 134, such stray electrical current is still subject to collection in accordance with the above-described stray electrical current collection function of the underwater light assembly 110.

Referring again to FIG. 7, the base 170 is secured to a rear surface 166 of the backplate 122 by appropriate conventional hardware, and sealed thereagainst via a first O-ring 176. A largely open region 178 exists between the base 170 and the backplate 122, beneath the sealed connection between the base 170 and the backplate 122, and has a function to be explained hereinafter. The cover 172 is secured to the base 170 by appropriate conventional hardware, is sealed thereagainst via a second O-ring 180, and is electrically coupled to a path to ground via a grounding lug 182 (see also FIG. 5) mounted both to the cover 172 and the backplate 122. In this manner, the base 170 and the cover 172 form the transformer compartment 168, the volume of which is physically separated from that of the outer compartment 154, and the walls of which are also physically separated from those of the outer compartment 154. The function and significance of this separate (and separated) compartment mounting arrangement with respect to the transformer 130 and the printed circuit assembly 124 will now be described in conjunction with FIG. 8, in which is illustrated the underwater light assembly 110 assembled within an appropriate wet niche 162, e.g., Hayward Pool Product's SP0601U wet niche.

Figure 8:
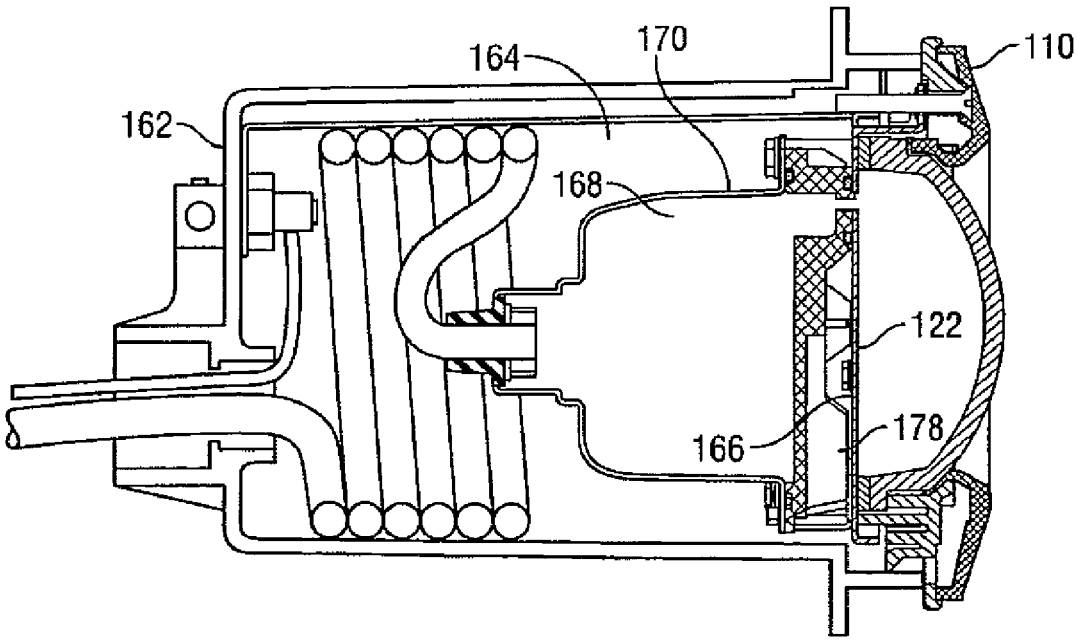
FIG. 8 is a side cross-sectional view of the underwater light assembly of FIG. 5, shown assembled within a wet niche.

Referring to FIG. 8, spa water flowing in and out of an inner chamber 164 may be used to cool both the rear surface 166 of the backplate 122 and all external surfaces of the transformer compartment 168 (i.e., the external surfaces of the base 170 and the cover 172, including those external surfaces of the backplate 122 and the base 170 adjacent the largely open region 178). Such wet niches are often built into concrete spa walls, and their use can be especially beneficial when, as in the present invention, the underwater light employed is equipped with multiple high-intensity LEDs requiring rapid rates of heat removal to remain within an acceptable range of operating temperatures. In particular, it is noted that the underwater light assembly 110 includes exterior surfaces exposed to cooling spa water amounting to a significantly higher total surface area than known spa lights for use in similar applications. Specifically, the separate transformer compartment 168 is, by this expansion of spa-water cooled exterior surfaces, equipped with an essentially separate cooling mechanism, such that not only are the transformer compartment 168 and outer compartment 154 separately cooled, but they are essentially completely thermally isolated. As such, any heat generated by the transformer 130 is essentially incapable of affecting the printed circuit assembly 124, and vice versa. Since with respect to the present underwater light assembly 110 both components will tend to run quite hot, such thermal isolation is essential to ensuring all hot-running components of the underwater light assembly 110 are maintained within an acceptable range of operating temperatures.

It should be appreciated that the underwater light assembly 110 of the present invention provides numerous advantages over the prior art discussed above. Since the underwater light assembly 110 is equipped with a 120V A/C to 12V A/C transformer, it may be conveniently coupled directly to standard 120V A/C power obtained from a remote source to which multiple instances of the underwater light assembly may be coupled in parallel. The underwater light assembly 110 may be incorporated into the concrete wall of a permanent (e.g., below ground) spa, as may other known spa lights, but the underwater light assembly 110 provides the further advantage of being simultaneously capable of producing its own DC power from an external 120V A/C source, and producing white light of exceptional brilliance/luminosity from multiple arrays of color LEDs, without risk of overheating. At least one major hurdle to this type of performance is cleared by the above-described separate transformer compartment arrangement for maximizing spa water cooling, e.g., in combination with similar backplate and lens exterior-surface cooling.

It should be noted that the underwater light assembly 110 of the present invention can have numerous modifications and variations. For example, in particular spa lighting applications in which a built-in transformer design is not required, the transformer 130 and the separate transformer compartment 168 can be removed from the underwater light assembly 110 (i.e., similar to the underwater light assembly 10 associated with the first embodiment of the present invention, discussed above). In such applications, the underwater light assembly 110 can be supplied with external 12V A/C power (e.g., by the use of a conventional off-the-shelf 120V A/C to 12V A/C transformer mounted in a steel enclosure near the spa) for later conversion to DC power.

It will be understood that the embodiments of the present invention described herein are merely exemplary and that a person skilled in the art may make many variations and modifications without departing from the spirit and scope of the invention. For example, the transformer 30 of the underwater light assembly 10 associated with the above-discussed first embodiment for a pool lighting application can be housed in a substantially separate rearwardly-extending compartment (e.g., similarly to the transformer 130 of underwater light assembly 110 associated with the above-discussed second embodiment for a spa lighting application). All such variations and modifications, including those discussed above, are intended to be within the scope of the invention as defined in the appended claims.

What is claimed is:

1. An underwater light, comprising*:* an ordinarily watertight housing;

an outer compartment within said housing, said outer compartment being subject to flooding by water flowing therein from outside said housing in the event said housing is no longer watertight;

a current shield disposed within said outer compartment, said current shield at least partially defining an inner compartment within said [outer compartment;] *housing, said current shield inhibiting a stray electrical current from escaping said inner compartment when said housing is no longer watertight and said inner compartment is subject to flooding by water flowing therein;* a light emitter disposed within said inner compartment; [a passageway communicating between said inner compartment and said outer compartment such that at least a portion of any water flooding said outer compartment can enter said inner compartment and come into contact with said light emitter; and] *and* a conductor positioned so as to collect [any and substantially all] *the* stray electrical current [that may be conducted] from said inner compartment [by water within said passageway], thereby reducing the risk of electrical shock presented by [such] *the* stray electrical current.

2. The underwater light of claim 1, wherein said conductor includes an electrically conductive surface which at least partially defines [said passageway.] *a passageway between said inner and outer compartments.*

3. The underwater light of claim 2, wherein said current shield includes an electrically insulative surface which at least partially defines said passageway, said electrically insulative surface being disposed opposite said electrically conductive surface so as to cause any and all stray electrical current that may be conducted from said inner compartment by water within said passageway to pass along and in close proximity to said electrically conductive surface, thereby facilitating the collection of such stray electrical current by said conductor.

4. The underwater light of claim 3, wherein said current shield is dome-like in shape and includes a lower peripheral edge which includes said electrically insulative surface.

5. The underwater light of claim 3, wherein at least a portion of said electrically insulative surface is in physical contact with said electrically conductive surface.

6. The underwater light of claim 3, wherein said electrically insulative surface and said electrically conductive surface are separated by a gap.

7. The underwater light of claim 6, wherein said gap is not more than about 0.1 inches.

8. The underwater light of claim 6, wherein said gap is not more than about 0.02 inches.

9. The underwater light of claim 4, wherein said lower peripheral edge of said current shield has a width of not less than about 0.04 inches.

10. The underwater light of claim 4, wherein said lower peripheral edge of said current shield has a width in a range from about 0.05 inches to about 0.07 inches.

11. The underwater light of claim 2, wherein said conductor is adapted for connection to an electrical ground.

12. The underwater light of claim 2, wherein said conductor includes a metal plate, and said conductive surface is a portion of said metal plate.

13. The underwater light of claim 12, wherein said light emitter is mounted to said metal plate.

14. The underwater light of claim 1, wherein said light emitter includes an array of light emitting diodes.

15. The underwater light of claim 1, wherein said housing includes a lens which defines at least a portion of said outer compartment.

16. The underwater light of claim 15, wherein said lens is made from glass.

17. The underwater light of claim 15, wherein said current shield is made from translucent plastic and is disposed between said lens and said light emitter.

18. The underwater light of claim 15, wherein said current shield is made from transparent plastic.

19. The underwater light of claim 1, further comprising a transformer compartment spaced apart from said inner and outer compartments by a distance sufficiently long so as to permit a free flow of water in a space between said transformer compartment and said inner and outer compartments for efficient removal of heat therefrom.

20. An assembly comprising the underwater light of claim 19 installed within a wet niche of standard size for a below-ground spa installation.

*21. An underwater light, comprising:*

*an ordinarily watertight housing;*

*an outer region within said housing, said outer region being subject to flooding by water flowing therein from outside said housing in the event said housing is no longer watertight;*

*a current shield disposed within said housing, said current shield at least partially defining an inner region within said housing, said current shield inhibiting a stray electrical current from escaping said inner region when said housing is no longer watertight and said inner region is subject to flooding by water flowing therein;*

*a light emitter disposed within said inner region; and*

*a conductor positioned so as to collect the stray electrical current from said inner region, thereby reducing the risk of electrical shock presented by the stray electrical current.*

*22. The underwater light of claim 21, wherein said conductor includes an electrically conductive surface which at least partially defines a passageway between said inner and outer regions.*

*23. The underwater light of claim 22, wherein said current shield includes an electrically insulative surface which at least partially defines said passageway, said electrically insulative surface being disposed opposite said electrically conductive surface so as to cause any and all stray electrical current that may be conducted from said inner region by water within said passageway to pass along and in close proximity to said electrically conductive surface, thereby facilitating the collection of such stray electrical current by said conductor.*

*24. The underwater light of claim 23, wherein said current shield is dome-like in shape and includes a lower peripheral edge which includes said electrically insulative surface.*

*25. The underwater light of claim 23, wherein at least a portion of said electrically insulative surface is in physical contact with said electrically conductive surface.*

*26. The underwater light of claim 23, wherein said electrically insulative surface and said electrically conductive surface are separated by a gap.*

*27. The underwater light of claim 26, wherein said gap is not more than about 0.1 inches.*

*28. The underwater light of claim 26, wherein said gap is not more than about 0.02 inches.*

*29. The underwater light of claim 24, wherein said lower peripheral edge of said current shield has a width of not less than about 0.04 inches.*

*30. The underwater light of claim 24, wherein said lower peripheral edge of said current shield has a width in a range from about 0.05 inches to about 0.07 inches.*

*31. The underwater light of claim 22, wherein said conductor is adapted for connection to an electrical ground.*

*32. The underwater light of claim 22, wherein said conductor includes a metal plate, and said conductive surface is a portion of said metal plate.*

*33. The underwater light of claim 32, wherein said light emitter is mounted to said metal plate.*

*34. The underwater light of claim 31, wherein said light emitter includes an array of light emitting diodes.*

*35. The underwater light of claim 31, wherein said housing includes a lens which defines at least a portion of said outer region.*

*36. The underwater light of claim 35, wherein said lens is made from glass.*

*37. The underwater light of claim 35, wherein said current shield is made from translucent plastic and is disposed between said lens and said light emitter.*

*38. The underwater light of claim 35, wherein said current shield is made from transparent plastic.*

*39. The underwater light of claim 31, further comprising a transformer compartment spaced apart from said inner and outer regions by a distance sufficiently long so as to permit a free flow of water in a space between said transformer compartment and said inner and outer regions for efficient removal of heat therefrom.*

*40. An assembly comprising the underwater light of claim 39 installed within a wet niche of standard size for a below-ground spa installation.*

*41. An underwater light, comprising:*

*an ordinarily watertight housing provided with a lens area ordinarily occupied by a lens;*

*an outer region within said housing, said outer region being subject to flooding by water flowing therein from outside said housing in the event said housing is no longer watertight;*

*a current shield disposed within said housing, said current shield at least partially defining an inner region within said housing, said current shield inhibiting a stray electrical current from escaping said inner region when said housing is no longer watertight and said inner region is subject to flooding by water flowing therein;*

*a light emitter disposed within said inner region; and*

*a conductor positioned so as to collect the stray electrical current from said inner region, thereby reducing the risk of electrical shock presented by the stray electrical current;*

*wherein said current shield guides the stray electrical current to said conductor when said inner region is flooded.*

*42. The underwater light of claim 41, wherein said current shield comprises a span.*

*43. The underwater light of claim 42, wherein said span comprises a material that is at least one of transparent and translucent.*

*44. The underwater light of claim 43, wherein said span comprises a polymer.*

*45. The underwater light of claim 41, comprising a lens occupying said lens area at least when said housing is watertight.*

* * * * *

UNITED STATES PATENT AND TRADEMARK OFFICE

CERTIFICATE OF CORRECTION

PATENT NO. : RE43,492 E
APPLICATION NO. : 12/258091
DATED : June 26, 2012
INVENTOR(S) : Vance Willis It is certified that error appears in the above-identified patent and that said Letters Patent is hereby corrected as shown below:

On the second page of the patent under "U.S. Patent Documents", Patent 6,798,154 "Suilivan" should be --Sullivan--.

Signed and Sealed this
Twenty-eighth Day of August, 2012

David J. Kappos

David J. Kappos
*Director of the United States Patent and Trademark Office*